United States Patent [19]
Huh et al.

[11] Patent Number: 6,040,678
[45] Date of Patent: Mar. 21, 2000

[54] SWITCHED RELUCTANCE MOTOR HAVING NOISE AND VIBRATION REDUCED

[75] Inventors: Kyung Bum Huh, Busan; Kwang Joon Kim, Taejun, both of Rep. of Korea

[73] Assignee: Korea Advanced Institute Science and Technology, Taejun, Rep. of Korea

[21] Appl. No.: 09/103,978

[22] Filed: Jun. 24, 1998

[30] Foreign Application Priority Data

Jun. 24, 1997 [KR] Rep. of Korea ...................... 97-26966

[51] Int. Cl.⁷ .................................................. H02P 1/46
[52] U.S. Cl. .......................................... 318/701; 318/254
[58] Field of Search ..................................... 318/701, 254

[56] References Cited

U.S. PATENT DOCUMENTS

| | | | |
|---|---|---|---|
| 4,942,345 | 7/1990 | Horst | 318/254 |
| 5,446,359 | 8/1995 | Horst | 318/701 |
| 5,461,295 | 10/1995 | Horst | 318/701 |
| 5,532,567 | 7/1996 | Iwasaki et al. | 318/701 |
| 5,589,752 | 12/1996 | Iwasaki et al. | 318/701 |
| 5,652,493 | 7/1997 | Hendershot, Jr. | 318/701 |
| 5,767,638 | 6/1998 | Wu et al. | 318/254 |
| 5,796,226 | 8/1998 | Ookawa et al. | 318/254 |
| 5,814,965 | 9/1998 | Randall | 318/701 |
| 5,864,218 | 1/1999 | Orthmann | 318/701 |

OTHER PUBLICATIONS

D.E. Cameron, "The Origin and Reduction of Acoustic Noise in Doubly Salient Variable–Reluctance Motors", *IEEE Transactions on Industry Applications*, vol. 28, No. 6 (1992).

C.Y. Wu, "Time Domain Analysis of Vibration and Acoustic Noise in the Switched Reluctance Drive", *IEEE Sixth International Conference on Electrical Machines and Drives*, (Sep. 1993).

*Primary Examiner*—Brain Sircus
*Attorney, Agent, or Firm*—E. Russell Tarleton; Seed and Berry LLP

[57] ABSTRACT

A switched reluctance motor having a rotor and a stator is provided the motor includes means for adjusting a relative angle between a switch turn-off angle at which a switch for supplying power to a coil is turned off, and a tooth overlap angle at which a tooth portion of the rotor and a tooth portion S of the stator are overlapped according to a predetermined calculation. The switched reluctance motor has reduced vibration and noise levels, thereby increasing their application.

18 Claims, 5 Drawing Sheets

SWITCHED RELUCTANCE MOTOR HAVING NOISE AND VIBRATION REDUCED

BACKGROUND OF THE INVENTION

The present invention relates generally to a switched reluctance motor, and more particularly, to a switched reluctance motor having reduced noise and vibration levels.

Generally, a switched reluctance motor (SRM) is a simple motor having a very high rotating speed. However, SRM's are very limited in their application because they typically experience excessive noise and vibration. In a switched reluctance motor, a main excitation force is an electromagnetic force applied in a radial direction between the stator and the rotor. The electromagnetic force is determined by the inductance of the motor and the electrical current passed through the coil of the motor. Several methods are known for reducing the noise and vibration levels in a motor. One such method concerns reducing the power component of the excitation force in the motor body by modulating current wave shapes of the electric power which drives the SRM. In this case, the power component to be reduced has a frequency adjacent to a dominant natural frequency of the motor body. However, this method does not provide adequate means to reduce the component of an excitation force in a SRM having a high rotating speed. Another known method is to make a switch dither at the time the switch is turned on or off such that the energy from the excitation force component is dispersed to surrounding frequencies of the component. In the case where the excitation force component has a frequency remote from the dominant natural frequency, this method is not applicable for the high rotating speeds of the SRM.

In yet another known method, the current wave shape, at the time the switch is turned off, is modulated such that the power of the excitation force component is reduced. However, in this case, the noise and vibration levels at the time the switch is turned off are not always the most significant contributors to the noise and vibration level. For example, for motors with large torque and power levels, the switching angle at turn on is set to get away from the angle of overlap between to tooth portion of a rotor with a tooth portion of a stator. In this case, the above method fails to compensate for the noise and vibration generated in the overlap angle.

Meanwhile, in case of a motor having a relatively low dominant natural frequency, noise is generated not only at the time a switch is turned off, but also at the time an edge of a rotor tooth begins to meet an edge of a stator tooth.

SUMMARY OF INVENTION

In one aspect, the invention relates a switched reluctance motor having a relatively low dominant natural frequency, which includes a rotor and a stator. The switched reluctance motor further includes means for adjusting difference between a first angle and a second angle. The first angle is associated with a position, at which the motor is switched off, while the second angle is associated with a position, at which an edge of a rotor tooth begins to meet an edge of a stator tooth.

Implementations of the invention include the following.

The adjustment of the difference between the first angle and the second angle may be calculated as:

$$\frac{\omega(2\pi\eta - \frac{\pi}{2})}{2\pi f_0} \leq \varphi \leq \frac{\omega(2\pi\eta + \frac{\pi}{2})}{2\pi f_0}$$

wherein, $\varphi$ is the adjustment that is no more than difference between said second and an alignment angle associated with a position, at which a rotor tooth is aligned with a stator tooth, $\omega$ is an angular speed of the rotor, $f_0$ is a dominant natural frequency of a body including the switched reluctance motor, and $\eta$ is an integer.

The above equation for calculating the adjustment of the difference between the first and the second angles may be simplified as:

$$\varphi \equiv \frac{\eta\omega}{f_0}$$

wherein, $\varphi$ is the adjustment that is no more than difference between said second and an alignment angle associated with a position, at which a rotor tooth is aligned with a stator tooth, $\omega$ is an angular speed of the rotor, $f_0$ is a dominant natural frequency of a body including the switched reluctance motor, and $\eta$ is an integer.

In another aspect, the invention relates to a method for reducing noise and vibration levels of a switched reluctance motor having a relatively low dominant frequency, which includes a rotor and a stator. The method includes steps of measuring a dominant natural frequency of a body including the switched reluctance motor, measuring a first angle associated with a position, at which the motor is switched off, and measuring a second angle associated with a position, at which an edge of a rotor tooth begins to meet an edge of a stator tooth. The method also includes adjusting difference between the first and the second angles to minimize said noise and vibration levels.

Other advantages and features of the present invention will become apparent from the following description, including the drawings and claims.

DETAILED DESCRIPTION OF PREFERRED EMBODIMENTS

Figure 1:
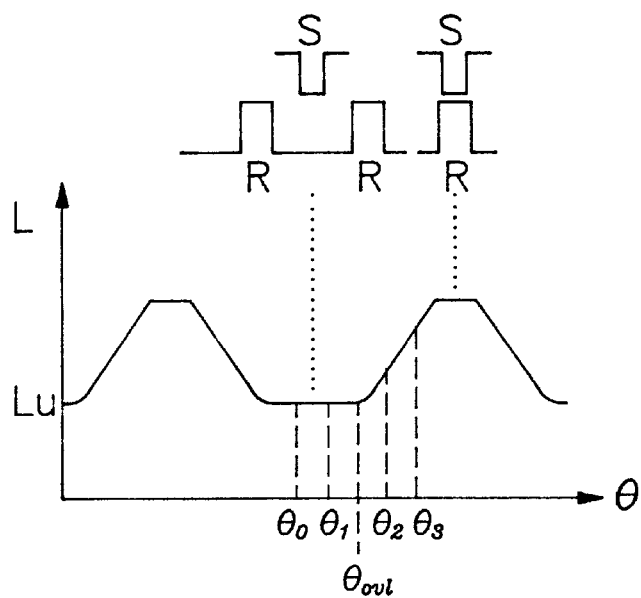
FIG. 1 is a graphical illustration comparing the angle of the switch versus the relative position of a tooth portion of the rotor and a tooth portion of the stator and an inductance of the motor.

FIG. 1 graphically illustrates the relationship between an angle θ of the switch, a relative position of the tooth portion R of the rotor to the tooth portion S of the stator, and an inductance L of the motor. In FIG. 1, $\theta_0$ represents the turn-on angle of the switch, and $\theta_3$ the turnoff angle of the switch. Assuming that the inductance L between $\theta_1$ and $\theta_2$ is represented by a quadratic equation, the inductance L in each zone can be represented as follows.

As for the zone of $\theta_0 \leq \theta \leq \theta_1$, $$L = L_U \tag{1}$$

As for the zone of $\theta_1 \leq \theta \leq \theta_2$, $$L(\theta) = a\theta^2 + b\theta + c \tag{2}$$

As for the zone of $\theta_2 \leq \theta$, $$L(\theta) = L(\theta_2) + \alpha \cdot (\theta - \theta_2) \tag{3}$$

In equations 3, 4, and 5, the value of each constant can be obtained by comparing the electrical current passing through the coil at various angles of the switch.

Figure 2A:
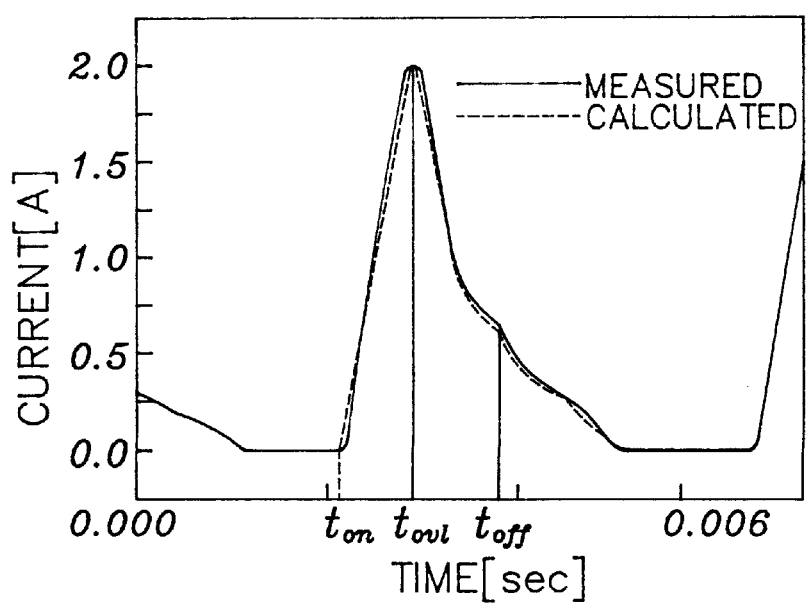
FIG. 2A is a graphical illustration of the calculated current versus the angle of the switch with a measured current on the coil of the motor.
Figure 2B:
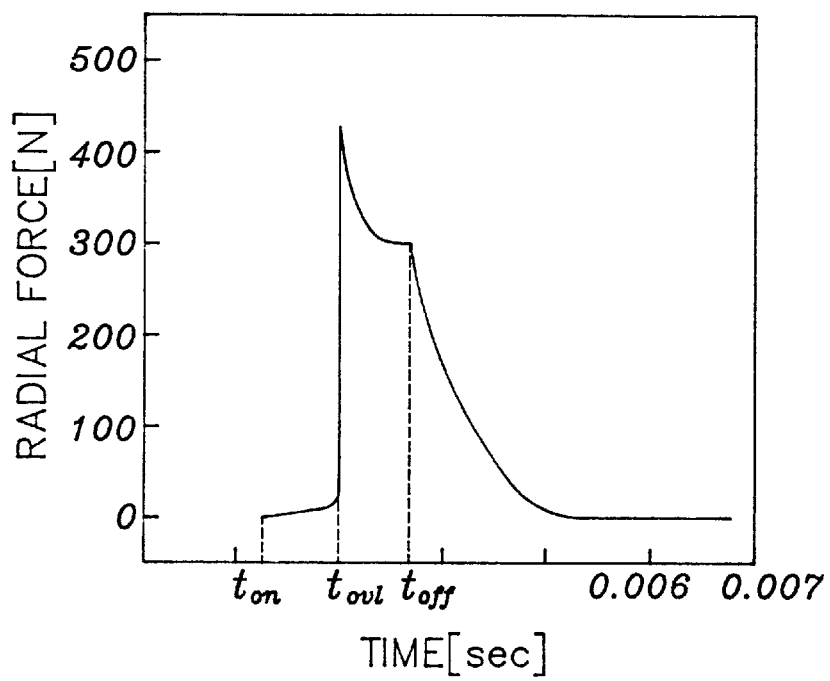
FIG. 2B is a graphical illustration of the electromagnetic force applied in a radial direction to the motor having the calculated current of FIG. 2A.

FIG. 2A graphically illustrates the calculated current versus the angle 6 as a function of the switching time of the motor switch and the measured current on the coil. FIG. 2B graphically illustrates the electromagnetic force applied in a radial direction to the motor, which is calculated using the calculated current. As shown in FIG. 2B, unlike the electrical current wave of FIG. 2A, an electromagnetic force wave may have a rectangular shape.

Figure 3A:
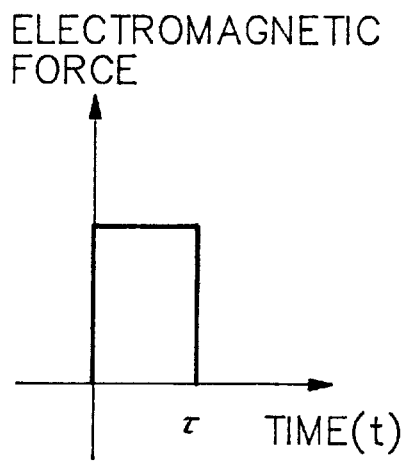
FIG. 3A illustrates a simplified graphical version of the electromagnetic force of FIG. 2B.
Figure 3B:
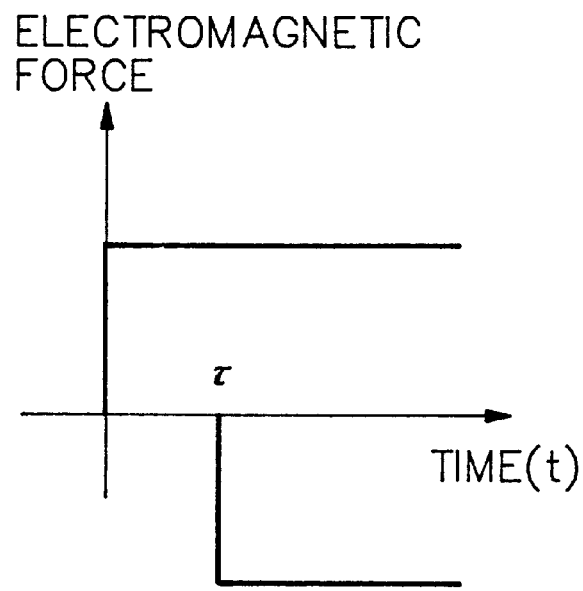
FIG. 3B shows the graphical component of the electromagnetic force of FIG. 3A.
Figure 4:
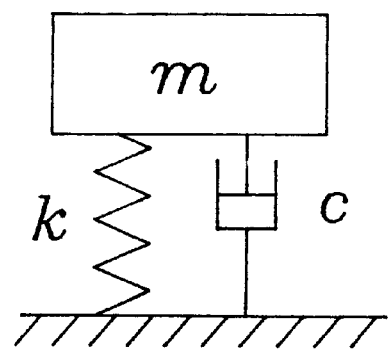
FIG. 4 shows a single freedom model of vibration.

An electromagnetic force having a rectangular shape, as shown in FIG. 3A, may he equal to a composition force of the two electromagnetic forces shown in FIG. 3B. These forces have different starting times and are applied in opposite directions to each other. If the vibration of the motor body is due to just one mode, a vibration system of the motor body may be reduced to a simplified model having only one degree of freedom, as shown in FIG. 4.

The vibration level may be represented as the vibration velocity of the motor body, because the vibration velocity of the motor body is closely related to the noise caused by the vibration. Thus, when the electromagnetic force shown in FIG. 3B is applied to the vibration system shown in FIG. 1, the vibration velocity V(f) may be calculated as:

$$V(f) = \frac{2\pi f \sqrt{2\{1 - \cos(2\pi f \tau)\}}}{\{k - m(2\pi f)^2\}^2 + (2\pi f c)^2} \tag{4}$$

where, k is the spring constant, c is the damping constant, m is the mass, τ is the period over which the electromagnetic force shown in FIG. 3A is applied to the motor or the start time of a first electromagnetic force and the start time of a second electromagnetic force, as shown in FIG. 3B, and f is the frequency in the frequency domain.

The vibration velocity V(f) is significantly affected by the term 2πfτ that is proportioned to the frequency f and the time τ. Accordingly, a condition for a small vibration velocity may be calculated as:

$$2\pi\eta - \frac{\pi}{2} \leq 2\pi f \tau \leq 2\pi\eta + \frac{\pi}{2} \tag{5}$$

where, η is an integer.

In the case, where 2πfτ=2πη, that is, τ=η/f, the vibration velocity is minimized.

The noise and vibration of the motor body are dependent on the component of the excitation force that has a frequency adjacent to a dominant natural frequency of the motor body. When the dominant natural frequency of the motor body is $f_0$, in order to reduce the vibration, $V(f_0)$ must be reduced. Thus, the conditions for the term 2πfτ must be met in equation 5.

In the case where $\tau = \eta/f_0$, the vibration is minimized. The term τ is the time over which the electromagnetic force is applied to the motor. In other words, τ includes the tooth overlap time $t_{ovl}$ for which an edge of the tooth portion R of the rotor and an edge of the tooth portion S of the stator begins to meet each other and the switch turn-off time $t_{off}$. The tooth overlap time $t_{ovl}$ is the time at which an angle a shown in FIG. 1 passes over the position of $\theta_{ovl}$. The switch turn-off $t_{off}$ is the time at which the angle θ shown in FIG. 1 passes over the position of $\theta_3$.

Accordingly, a relative angle φ between the tooth overlap angle $\theta_{ovl}$ and the switch turn-off angle $\theta_3$ may be calculated as:

$$\phi = \theta_3 - \theta_{ovl} \tag{6}$$

The time τ for which the electromagnetic force is applied may be calculated as:

$$\tau = \phi/\omega \tag{7}$$

From the above equations, to calculate a low vibration level condition, equation 7 may be rewritten as:

$$\frac{\omega(2\pi\eta - \frac{\pi}{2})}{2\pi f_0} \leq \varphi \leq \frac{\omega(2\pi\eta + \frac{\pi}{2})}{2\pi f_0} \tag{8}$$

where, ω is the angular speed of the rotor, $f_0$ is the dominant frequency of a body including the switched reluctance motor, and η is an integer.

Alternatively, equation 7 may be rewritten as:

$$\varphi \equiv \frac{\eta\omega}{f_0} \tag{9}$$

Figure 5:
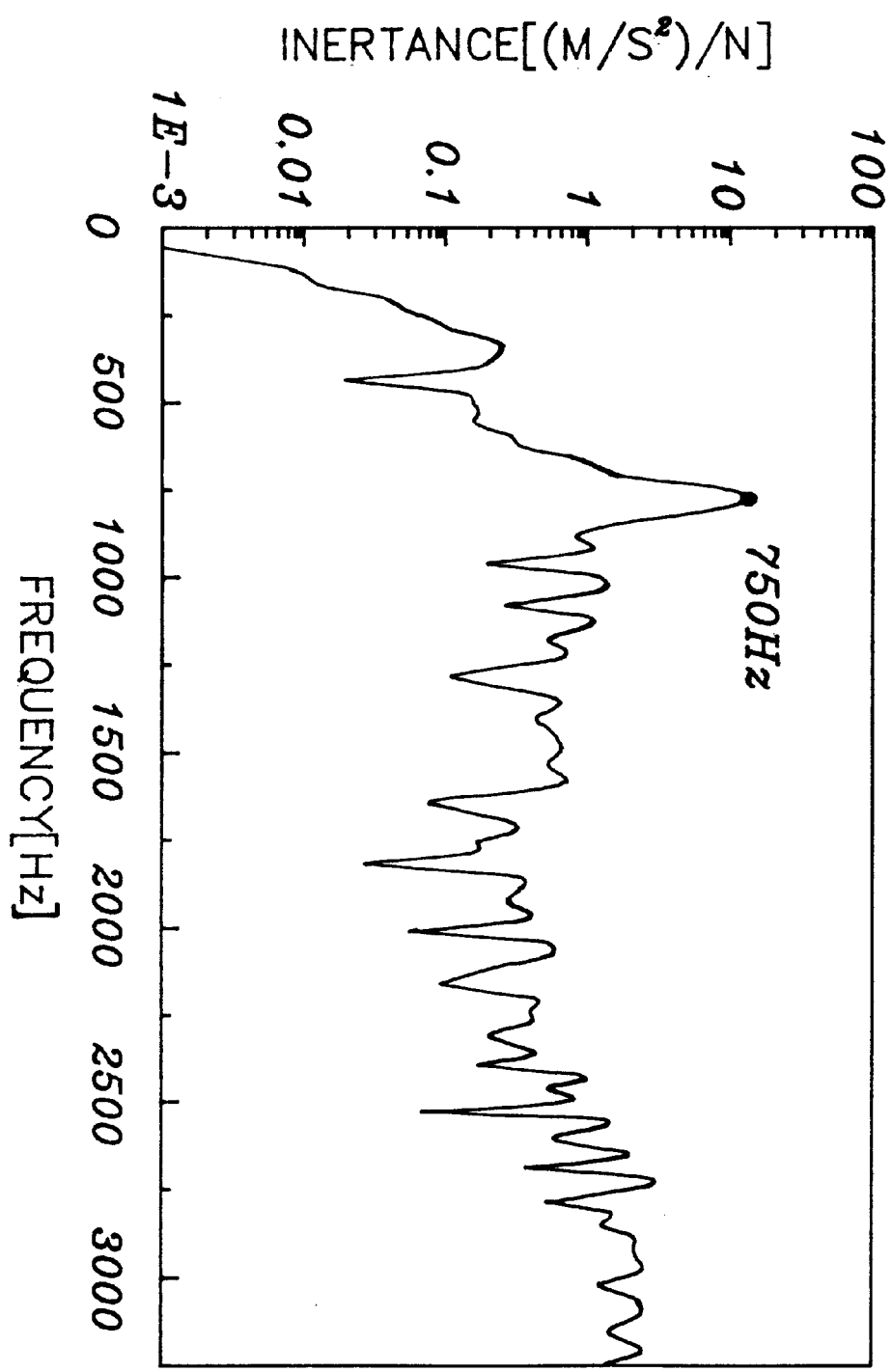
FIG. 5 shows a graphical representation of inertia versus frequency curve of a motor in accordance with the present invention.

FIG. 5 illustrates a characteristic curve for an exemplary SMR in accordance with the present invention. In this example, the dominant natural frequency of the motor body is about 750 Hz. The vibration mode is a single mode vibration. The input voltage of the switched reluctance motor is 100 volts DC, the rotational speed of the switched reluctance motor is 900 rpm, and the switch turn-on angle of the switched reluctance motor is 8°.

Figure 6A:
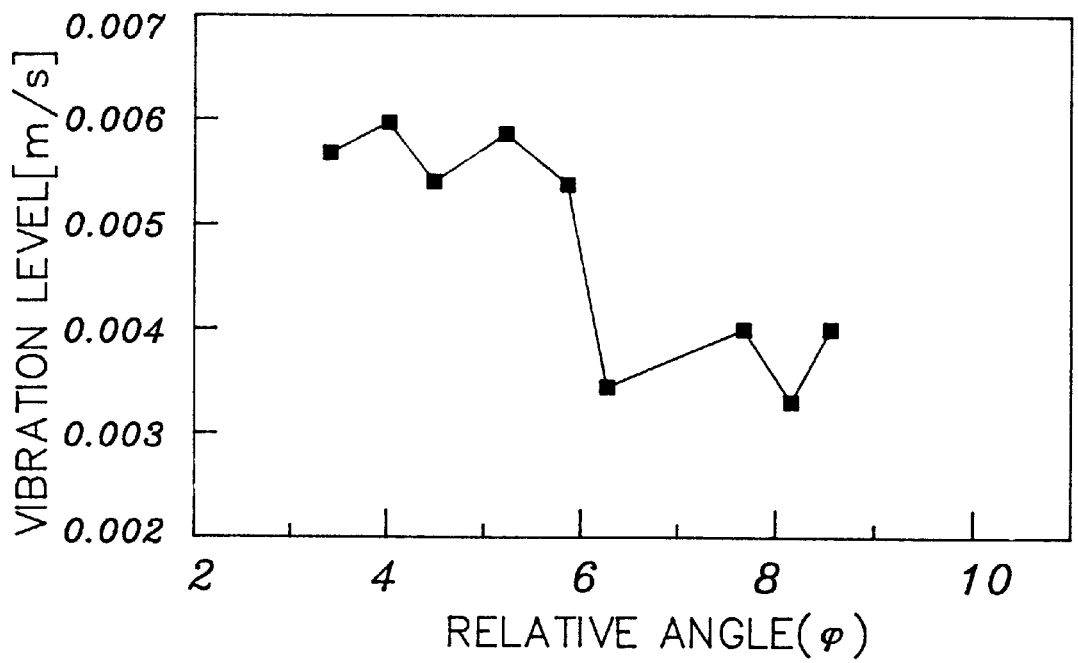
FIG. 6A is a graphical representation of the noise level measured with respect to difference between a first angle associated with a position, at which the motor is switched off, and a second angle associated with a position, at which an edge of a rotor tooth begins to meet an edge of a stator tooth.
Figure 6B:
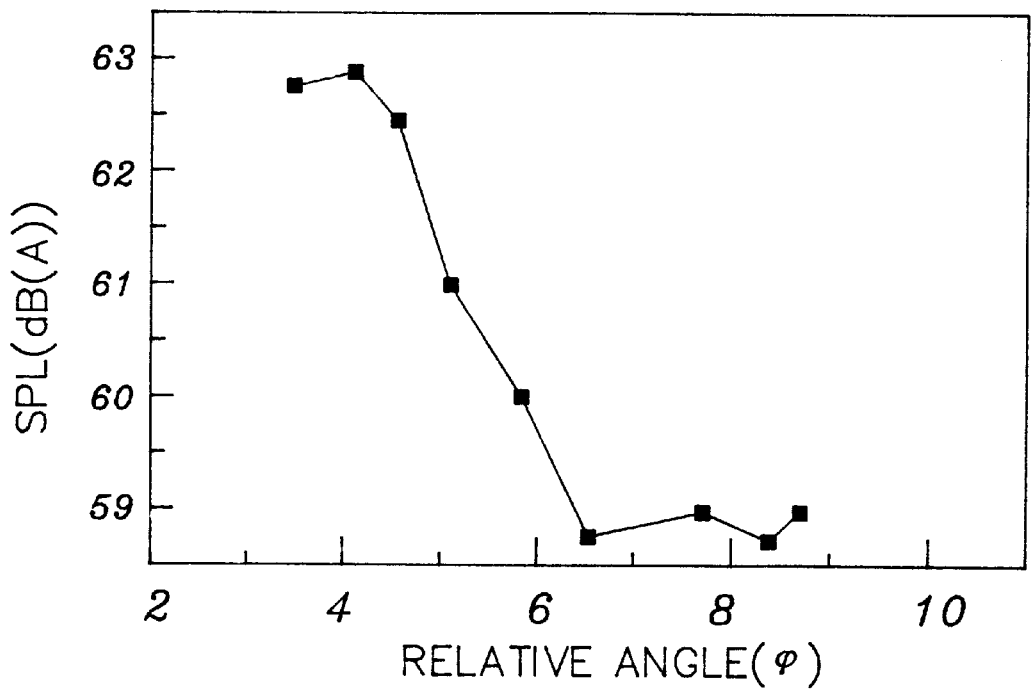
FIG. 6B is a graphical representation of the vibration level measured with respect to the difference between the first and the second angles.

FIGS. 6A and 6B show graphical representations of the vibration level and the noise level, respectively, measured with respect to difference between the tooth overlap angle and the switch turn-off of the motor of FIG. 5. The vibration level is obtained by measuring vibration velocity at points around the motor body surface, and the noise level is measured by a sound level meter about 1 meter from motor body. From FIGS. 6A and 6B, it can be seen that the noise and vibration are minimized when the relative angle φ is about 7°.

The result from the above measurement coincides with the calculated relative angle φ (=7.2°) from equation 9, where (ω=94.25 rad/sec, $f_0$=750 Hz and η=1.

The present invention has been described in terms of number of embodiments. The invention, however, is not limited to the embodiments depicted and described.

What is claimed is:

1. A switched reluctance motor having a relatively low dominant natural frequency, wherein the motor comprises:
    a rotor and a stator;
    a first angle associated with a position at which the motor is switched off;
    a second angle associated with a position at which an edge of a rotor tooth begins to meet an edge of a stator tooth; and
    means for adjusting a difference between said first angle and said second angle such that noise and vibration levels of said motor are minimized.

2. The switched reluctance motor of claim 1 wherein said relative angle adjustment is calculated as:

$$\frac{\omega(2\pi\eta - \frac{\pi}{2})}{2\pi f_0} \leq \varphi \leq \frac{\omega(2\pi\eta + \frac{\pi}{2})}{2\pi f_0}$$

wherein φ is the adjustment that is no more than the difference between said second angle and an alignment angle associated with a position at which a rotor tooth is aligned with a stator tooth, ω is an angular speed of the rotor, $f_0$ is a dominant natural frequency of a body including the switched reluctance motor, and η is an integer.

3. The switched reluctance motor of claim 1 wherein said relative angle adjustment is calculated as:

$$\varphi \equiv \frac{\eta\omega}{f_0}$$

wherein φ is the adjustment that is no more than the difference between said second angle and an alignment angle associated with a position at which a rotor tooth is aligned with a stator tooth, ω is an angular speed of the rotor, $f_0$ is a dominant natural frequency of a body including the switched reluctance motor, and η is an integer.

4. A method for reducing noise and vibration levels of a switched reluctance motor having a relatively low dominant frequency, the motor including a rotor and a stator, wherein the method comprises steps of:
    providing a body containing said motor;
    measuring a dominant natural frequency of said body;
    measuring a first angle associated with a position at which the motor is switched off;
    measuring a second angle associated with a position at which an edge of a rotor tooth begins to meet an edge of a stator tooth; and
    adjusting a difference between said first angle and said second angle to minimize said noise and vibration levels.

5. The method of claim 4, wherein said step of measuring said first angle comprises turning of a switch to prevent power from entering a coil of said motor.

6. The method of claim 4, further comprising adjusting said relative angle as:

$$\frac{\omega(2\pi\eta - \frac{\pi}{2})}{2\pi f_0} \leq \varphi \leq \frac{\omega(2\pi\eta + \frac{\pi}{2})}{2\pi f_0}$$

wherein φ is the adjustment that is no more than the difference between said second angle and an alignment angle associated with a position at which a rotor tooth is aligned with a stator tooth, ω is an angular speed of the rotor, $f_0$ is a dominant natural frequency of a body including the switched reluctance motor, and η is an integer.

7. The method of claim 4, further comprising adjusting said relative angle as;

$$\varphi \equiv \frac{\eta\omega}{f_0}$$

wherein φ is the adjustment that is no more than the difference between said second angle and an alignment angle associated with a position, at which a rotor tooth is aligned with a stator tooth, ω is an angular speed of the rotor, $f_0$ is a dominant natural frequency of a body including the switched reluctance motor, and η is an integer.

8. A switched reluctance motor, comprising:
    a rotor having at least one tooth associated therewith;
    a stator having at least one tooth associated therewith;
    the rotor and the stator defining a first angle between the rotor tooth and the stator tooth at which electric power to the motor is switched off;
    the rotor and the stator defining a second angle at which an edge of the rotor tooth begins to meet an edge of the stator tooth;
    the difference between the first angle and the second angle defining a relative angle; and
    means for adjusting the relative angle such that noise and vibration levels arising from motor operation are minimized.

9. The motor of claim 8 wherein a calculation of the adjustment of the relative angle comprises:

$$\frac{\omega(2\pi\eta - \frac{\pi}{2})}{2\pi f_0} \leq \varphi \leq \frac{\omega(2\pi\eta + \frac{\pi}{2})}{2\pi f_0}$$

wherein φ is the relative angle, ω is an angular speed of the rotor, $f_0$ is a dominant natural frequency of a body that includes the switched reluctance motor, and η is an integer.

10. The motor of claim 9 wherein the adjusting means is configured to adjust the relative angle to no more than the difference between the second angle and an alignment angle defined by a position at which the rotor tooth is aligned with the stator tooth.

11. The motor of claim 8 wherein the adjusting means is configured to adjust the relative angle in accordance with the following calculation:

$$\varphi \equiv \frac{\eta\omega}{f_0}$$

wherein φ is the relative angle, ω is an angular speed of the rotor, $f_0$ is a dominant natural frequency of a body including the switched reluctance motor, and η is an integer.

12. The motor of claim 11 wherein the adjusting means is configured to adjust the relative angle to no more that then difference between the second angle and an alignment angle defined as a position at which the rotor tooth is aligned with the stator tooth.

13. A method for reducing noise and vibration levels of a switched reluctance motor, the motor having a rotor with at least one tooth associated therewith and a stator with at least one tooth associated therewith, the rotor and the stator associated with a body, the method comprising:

measuring a dominant natural frequency of the body;

measuring a first angle between the positions of the rotor tooth and the stator tooth when electric power to the motor is switched off;

measuring a second angle between the rotor and the stator at which an edge of the rotor tooth begins to meet an edge of the stator tooth, the difference between the second angle and the first angle defining a relative angle between them; and adjusting the relative angle to minimize the noise and vibration levels.

14. The method of claim 13 wherein measuring the first angle comprises switching off electric power to the motor.

15. The method of claim 13 wherein adjusting the relative angle comprises adjusting a relative angle according to the following calculation:

$$\frac{\omega\left(2\pi\eta - \frac{\pi}{2}\right)}{2\pi f_0} \leq \varphi \leq \frac{\omega\left(2\pi\eta + \frac{\pi}{2}\right)}{2\pi f_0}$$

wherein $\phi$ is the relative angle, $\omega$ is an angular speed of the rotor, $f_0$ is a dominant natural frequency of the body including the rotor and the stator, and $\eta$ is an integer.

16. The method of claim 15 wherein adjusting the relative angle comprises adjusting the relative angle to no more than the difference between the second angle and an alignment angle defined as a position of alignment between the rotor tooth and the stator tooth.

17. The method of claim 13 wherein adjusting the relative angle comprises adjusting the relative angle according to the following calculation:

$$\varphi \equiv \frac{\eta\omega}{f_0}$$

wherein, $\phi$ is the relative angle, $\omega$ is an angular speed of the rotor, $f_0$ is a dominant natural frequency of the body including the rotor and the stator, and $\eta$ is an integer.

18. The method claim of 17 wherein adjusting the relative angle comprises adjusting the relative angle to no more than the difference between the second angle and an alignment angle defined as a position of alignment between the rotor tooth and the stator tooth.

* * * * *